(12) United States Patent
Case et al.

(10) Patent No.: US 10,822,711 B2
(45) Date of Patent: Nov. 3, 2020

(54) SELECTIVE CHROMING

(71) Applicant: Magna International Inc., Aurora (CA)

(72) Inventors: Ryan R. Case, Pinckney, MI (US); Michael A. West, Howell, MI (US); Lastawork Araya, Brampton (CA)

(73) Assignee: Magna International Inc., Aurora (CA)

( * ) Notice: Subject to any disclaimer, the term of this patent is extended or adjusted under 35 U.S.C. 154(b) by 177 days.

(21) Appl. No.: 15/028,633

(22) PCT Filed: Oct. 10, 2014

(86) PCT No.: PCT/US2014/060118
§ 371 (c)(1),
(2) Date: Apr. 11, 2016

(87) PCT Pub. No.: WO2015/054624
PCT Pub. Date: Apr. 16, 2015

(65) Prior Publication Data
US 2016/0237583 A1    Aug. 18, 2016

Related U.S. Application Data

(60) Provisional application No. 61/889,940, filed on Oct. 11, 2013.

(51) Int. Cl.
*C25D 7/00*    (2006.01)
*B32B 3/04*    (2006.01)
(Continued)

(52) U.S. Cl.
CPC ............ *C25D 5/02* (2013.01); *B29C 37/0025* (2013.01); *B29C 45/0053* (2013.01);
(Continued)

(58) Field of Classification Search
CPC .... Y10T 428/24322; C25D 3/04; C25D 7/00; C25D 5/02; B32B 3/04; B32B 3/26; B32B 27/365; B32B 3/266
(Continued)

(56) References Cited

U.S. PATENT DOCUMENTS 4,077,852 A * 3/1978 Koontz ................... C25D 5/02
205/135
2003/0025045 A1* 2/2003 Hinokio ................. H04R 1/023
248/27.1
(Continued)

FOREIGN PATENT DOCUMENTS

DE      44 16 986 A1    5/1995
EP      1 020 947 A2    7/2000
(Continued)

OTHER PUBLICATIONS

International Search Report for International Application No. PCT/US2014/060118, dated Feb. 10, 2015.

*Primary Examiner* — Joanna Pleszczynska
(74) *Attorney, Agent, or Firm* — Warn Partners, P.C.

(57) ABSTRACT

A final injection molded assembly and process for making same that eliminates paint and reduces areas of wasted chrome material. The final injection molded assembly has at least one first injection molded part of a non-plateable first material, at least one overmolded part of plateable second material, at least one pathway through the assembly and integrated features operable for selectively applying an electric current. The pathway creates a predetermined surface path arrangement for applying chrome to desired predetermined plateable areas. A shot of each material is delivered to an injection molding rotary device to produce the injection molded assembly which is then affixed to a chroming process line where electric current is applied. As
(Continued)

12 the electric current is applied and chrome is delivered only the plateable second material will accept the chrome.

7 Claims, 3 Drawing Sheets

(51) Int. Cl.
| | |
|---|---|
| *B32B 3/26* | (2006.01) |
| *C25D 5/02* | (2006.01) |
| *B29C 45/00* | (2006.01) |
| *B29C 45/16* | (2006.01) |
| *B29C 37/00* | (2006.01) |
| *C25D 3/04* | (2006.01) |
| *C25D 5/54* | (2006.01) |
| *B29K 69/00* | (2006.01) |
| *B29L 31/00* | (2006.01) |
| *B29K 255/02* | (2006.01) |
| *B29L 9/00* | (2006.01) |
| *B29L 31/30* | (2006.01) |

(52) U.S. Cl.
CPC .......... *B29C 45/16* (2013.01); *B29C 45/1679* (2013.01); *C25D 3/04* (2013.01); *C25D 5/54* (2013.01); *C25D 7/00* (2013.01); *B29C 2045/0079* (2013.01); *B29C 2045/1681* (2013.01); *B29K 2069/00* (2013.01); *B29K 2255/02* (2013.01); *B29K 2995/0022* (2013.01); *B29L 2009/008* (2013.01); *B29L 2031/3002* (2013.01); *B29L 2031/722* (2013.01)

(58) Field of Classification Search
USPC ..................................... 428/542.2; 296/1.08
See application file for complete search history.

(56) References Cited

U.S. PATENT DOCUMENTS

| | | | |
|---|---|---|---|
| 2004/0209032 | A1 | 10/2004 | Wani et al. |
| 2012/0225255 | A1* | 9/2012 | Reeder ................ B29C 45/0053 428/172 |
| 2012/0235323 | A1 | 9/2012 | Anta Villar et al. |
| 2012/0235436 | A1 | 9/2012 | Sun |

FOREIGN PATENT DOCUMENTS

| | | |
|---|---|---|
| GB | 2 266 410 A | 10/1993 |
| JP | 2002 111353 A | 4/2002 |
| JP | 2002 111368 A | 4/2002 |

* cited by examiner

SELECTIVE CHROMING

CROSS-REFERENCE TO RELATED APPLICATIONS

This application is a National Stage of International Application No. PCT/US2014/060118, filed Oct. 10, 2014, which claims priority to U.S. Provisional Patent Application No. 61/889,940 filed Oct. 11, 2013. The disclosures of the above applications are incorporated herein by reference.

FIELD OF THE INVENTION

The present invention relates to an injection molded assembly that has chrome and a process for making same.

BACKGROUND OF THE INVENTION

Known components with chrome have issues with delaminating and flaking of the chrome/paint and the processes known for making the components are also time consuming, labor intensive, and often results in a higher component piece price. Typical chrome parts, such as vehicle brand badges, are known to have warranty issues stemming from delaminating and/or flaking paint on paint-over chrome vehicle badges, which is asthetically displeasing and expensive to replace. One disadvantageous manufacturing process chromes all of the molded parts, e.g., chromes the entire vehicle badge, then masks the parts before painting only portions of the vehicle badge, e.g., such as painting only the letters. This results in increased manufacturing costs, labor, and time, and warranty issues. In one known attempt to remedy the aforementioned issues, a snap together design for a vehicle badge was employed with no painting, however, multiple parts with assembly are required. Such a design is more expensive and manufacturing of the snap together component is slow and expensive.

Accordingly, a process is desired which is operable for molding a final assembly that eliminates paint and reduces areas of wasted chrome material, while improving manufacturing cost and time.

SUMMARY OF THE INVENTION

There is provided a final injection molded assembly having at least two parts; an injection molded part made of non-plateable material and an overmolded part made of plateable material. An injection molding tool is provided for selectively injecting a shot of each material. A chroming line is also provided for selectively chroming only the plateable material. The injection molded assembly has at least one pathway operable to create a surface path to at least one area for the application of chrome to the desired plateable areas. Forming of the injection molded assembly provides the pathway through the assembly and the features operable for selectively applying an electric current. As the injection molded assembly passes through the chroming line the electric current is applied to the assembly and only the plateable material accepts the chrome.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

A final injection molded assembly is provided having one or more injection molded parts made of non-plateable material, one or more injection molded parts made of plateable material, and a pathway and incorporated features to direct flow path of chrome material to specific areas, and process for making same. The final injection molded assembly is manufactured using multiple shot injection molding for processing multiple parts of various materials in a single mold. There is depicted an assembly for a motor vehicle configured to reduce wasted chrome while directing chrome to areas that need chrome, in accordance with the present invention. FIGS. 1-8 show a vehicle badge/emblem to illustrate an exemplary molded assembly and process for making same that utilizes two shot injection molding with a rotary tool to produce a complete molded assembly in a single mold with particular part features that will reduce wasted chrome on the backside of the part and eliminate the need for paint or chrome resist coatings. The features and process described herein are suitable to allow application to any other vehicle assemblies where chroming is desired. Such applications include, but are not limited to, exterior/interior decorative trim, headlamp/fog lamp housings, and exterior grills.

Referring generally to FIGS. 1-8, there is provided a final injection molded assembly, shown generally at 10, having at least two parts; a first injection molded part 12 formed of a first material that is non-plateable and a second injection molded part 14 formed of a second material that is plateable. The first material is a plastic material with a predetermined high gloss appearance that will resist chrome material and pass predetermined performance specifications, e.g., for use in exterior vehicle applications as a replacement for paint.

This eliminates paint and the issue of paint delamination and/or flaking on vehicle emblems and badges. This also helps to reduce chrome material waste since the first material resists chrome. The second material will accept chrome material.

Figure 1:
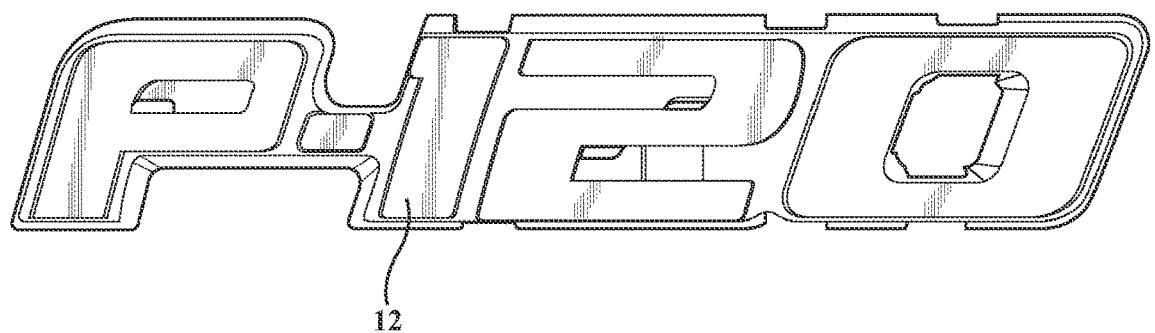
FIG. 1 is a front elevation view of a first injection molded part formed of a non-plateable material, in accordance with the present invention.
Figure 2:
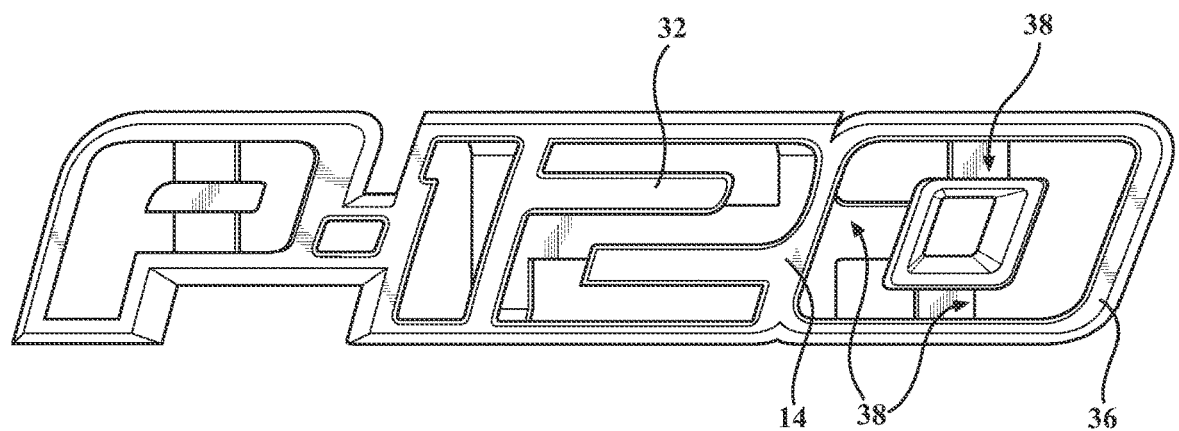
FIG. 2 is a front elevation view of a second injection molded part formed of a plateable material, in accordance with the present invention.
Figure 3:
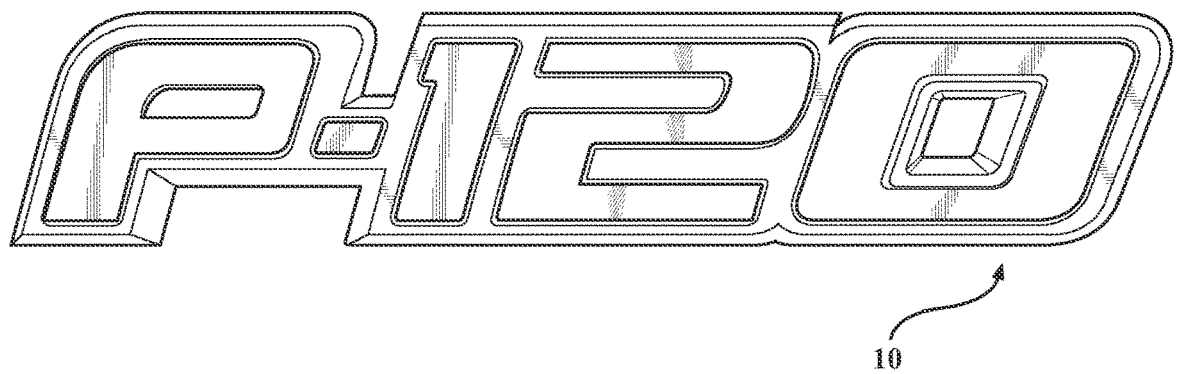
FIG. 3 is a front elevation view of a final injection molded assembly, in accordance with the present invention.
Figure 4:
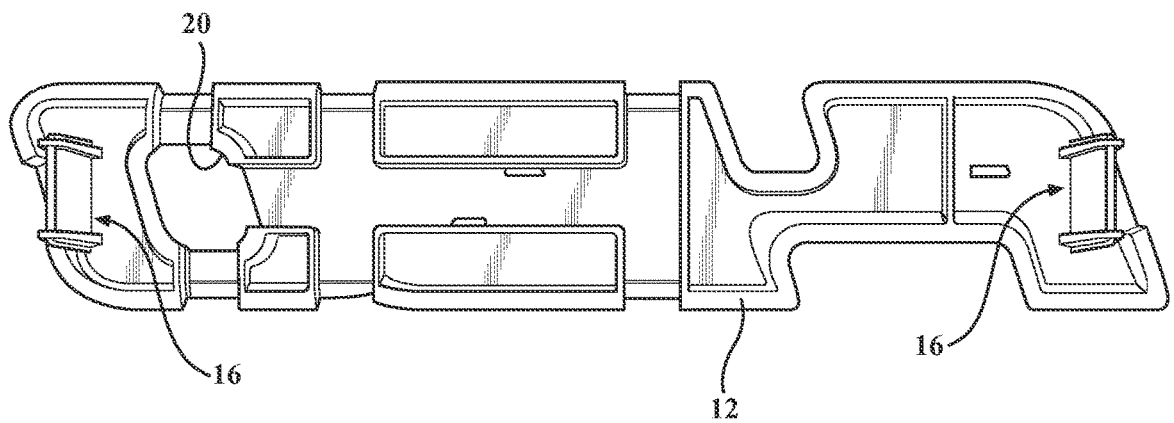
FIG. 4 is a rear elevation view of the first injection molded part depicted in FIG. 1, in accordance with the present invention.
Figure 5:
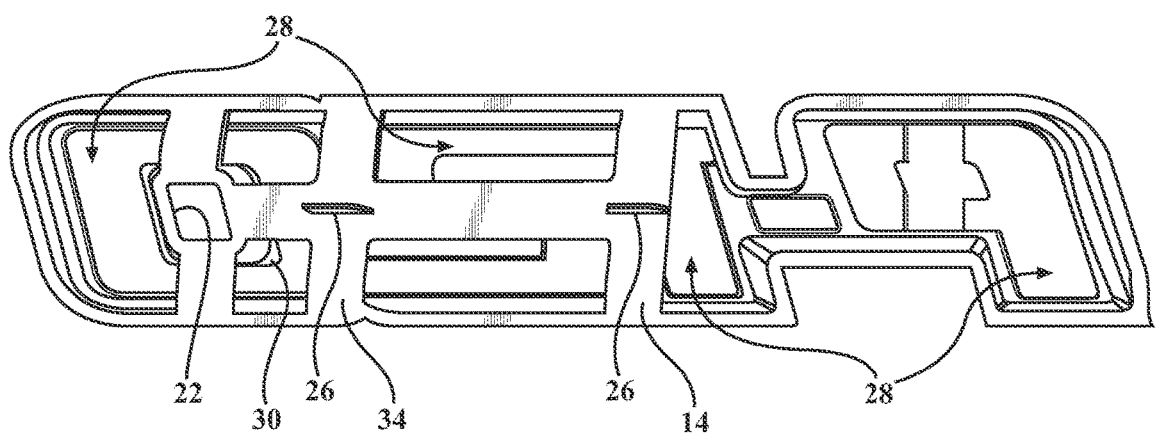
FIG. 5 is a rear elevation view of the second injection molded part depicted in FIG. 2, in accordance with the present invention.
Figure 6:
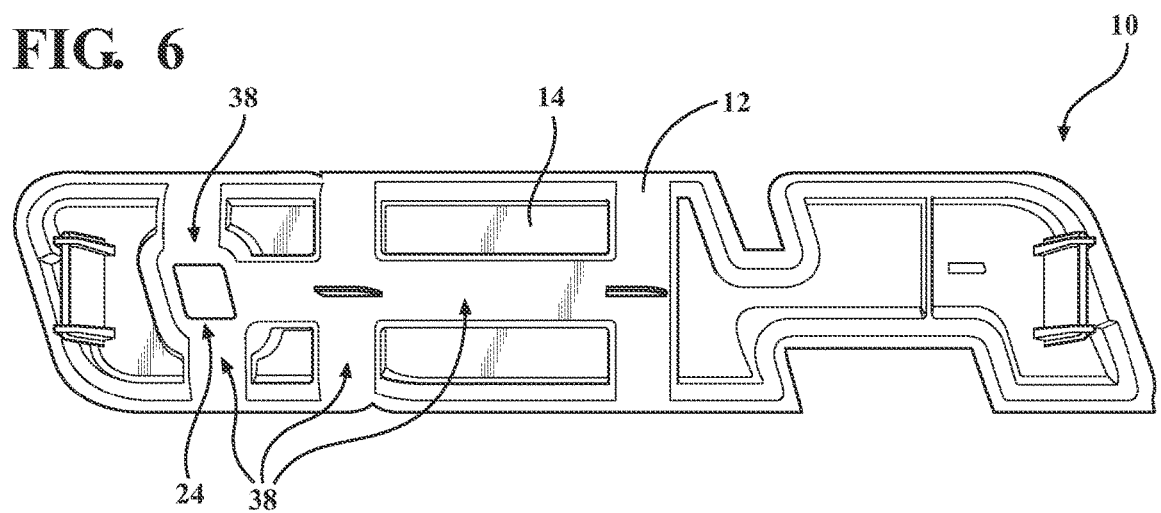
FIG. 6 is a rear elevation view of the final injection molded assembly depicted in FIG. 3, in accordance with the present invention.
Figure 7:
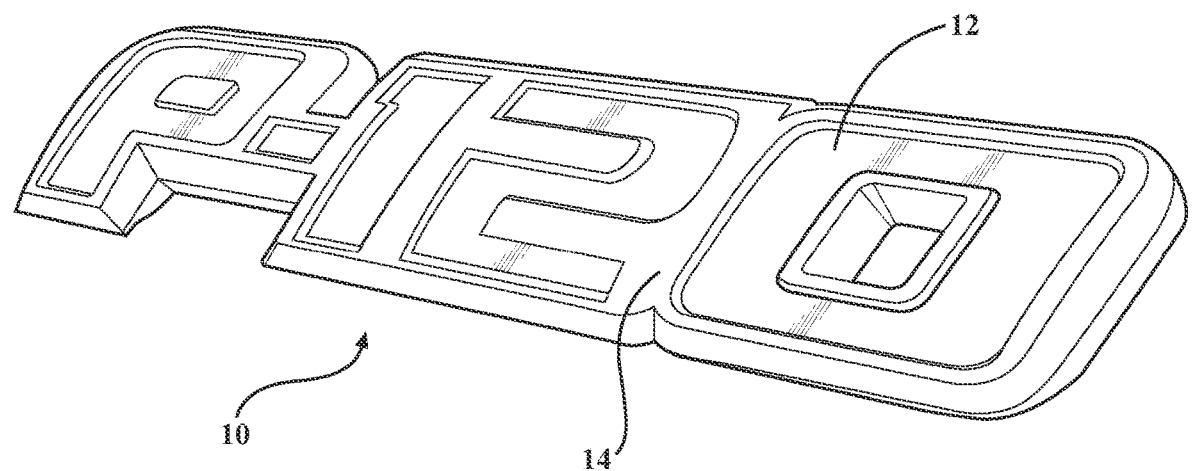
FIG. 7 is a front perspective view of the final injection molded assembly depicted in FIGS. 3 and 6, in accordance with the present invention.
Figure 8:
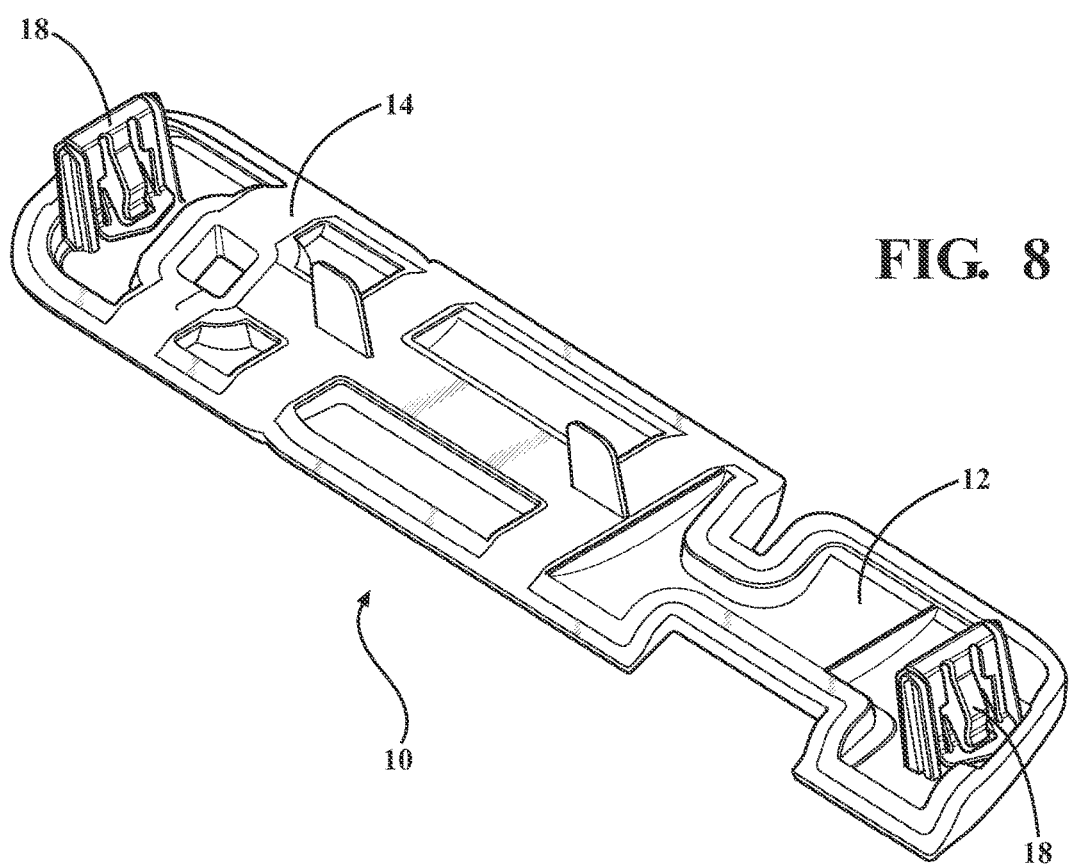
FIG. 8 is a rear perspective view of the final injection molded assembly depicted in FIGS. 3, 6 and 7, in accordance with the present invention.

The final injection molded assembly 10 includes at least one mounting feature operable for attachment to a motor vehicle. In accordance with one embodiment, FIGS. 4, 6 and 8 illustrate the backside of the first injection molded part 12 having at least two mounting features, shown generally at 16, each for receiving a respective attachment fixture 18 (FIG. 8) operable for mounting the final injection molded assembly 10 to the vehicle, e.g., clip for a snap fit engagement on the exterior of the vehicle such that the vehicle badge is prominently displayed.

The second injection molded part 14 forms a pathway, generally shown at 24, that provides a surface path for directing chrome to areas that need chrome. In one embodiment, the first injection molded part 12 has an opening 20 formed through the part in a location operable to align with another opening 22 formed through the second injection molded part 14, the second injection molded part 14 forming the pathway 24 that provides a surface path for directing chrome to areas that need chrome. The opening 20 is sized and configured to allow the second injection molded part 14 to extend through the opening 14 and have an overhang or lip 30 around the outer front side of the opening 20.

The pathway 24 is integrally formed with the front side 32 and the backside 34 of the second injection molded part 14. However, the pathway 24 is not located on the perimeter 36 of the component assembly 10. The pathway 24 is located inward and/or centrally from the perimeter 36 formed by the second injection molded part 14. Most preferably, the pathway 24 connects features or areas that are to be chromed that are not connected to the perimeter 36 on the class A side of the molded assembly 10. By way of non-limiting example, the "O" of the vehicle badge depicted in the figures having the pathway 24 is not connected to the perimeter 36 on the front side 32, Class A side, of the molded assembly 10, but is connected on the back side 34, non-show surface, with various paths, shown generally at 38, leading to the pathway 24.

The backside 34 of the second injection molded part 14 has at least one tab 26 that is operably configured and located for attaching the tab 26 of the final injection molded assembly 10 to a chroming path, e.g., for operably attaching to a rack that moves along a chroming process line, and for receiving a predetermined electric current. The second injection molded part 14 has a plurality of gaps, generally shown at 28, or areas with no material and the second injection molded part 14 is overmolded such that show surfaces of the first injection molded part 12 are viewable in the final injection molded assembly 10.

Making the final injection molded assembly 10 includes the steps of providing an injection molding tool and injecting a first shot of the first material that is non-plateable to form the first injection molded part 12 and overmolding the first injection molded part 12 with the second shot of the second material of the second injection molded part 14. The second material is operably plateable for accepting chrome. The at least one tab 26 is operably releasably attached to a chroming rack, e.g., attached to part of a rack configured for moving along a chroming path. The injection molded assembly is ran through a chroming process line where only the second material will accept the chrome being delivered. As the injection molded assembly travels along the chroming line path the pathway 24 provides a surface path to the areas that need chrome while the electric current is applied through the tabs 26 to allow the chrome to apply to the desired areas on the final injection molded assembly 10.

The first shot of material is non-plateable. This means that the material will not accept chrome. Most preferably, the non-plateable material is polycarbonate (PC). The second shot of material is plateable. This means that the material will accept chrome material. Most preferably, the plateable material is a PC acrylonitrile butadiene styrene (ABS).

The design features described herein will be implemented on any other chromed plastic part application suitable for reducing wasted chrome material on the backside of chromed parts and eliminate paint.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A final injection molded assembly for a motor vehicle, comprising:
    at least one first injection molded part of a first material that is non-plateable, said first injection molded part including an opening;
    at least two mounting features integrally formed on a backside of said at least one first injection molded part and each including an attachment feature forming a clip for attachment to said motor vehicle;
    at least one second injection molded part of a second material that is plateable, wherein the at least one first injection molded part is partially overmolded by the at least one second injection molded part, said second injection molded part having another opening aligned with the opening and said second injection molded part forming a lip around the exterior of said opening of said first injection molded part providing a show surface of said injection molded assembly, and said second molded part providing a perimeter show surface of said injection molded assembly; and
    wherein said second injection molded part forms a pathway through the opening and provides a surface path comprised of a plurality of paths on the back of said assembly that are coupled to the perimeter of the second injection molded part, said plurality of paths directs the flow path of chrome material to said show surface of said injection molded assembly and said perimeter show surface, when a predetermined electric current is applied, wherein said show surface and perimeter show surface are plated with said chrome material.

2. The final injection molded assembly of claim 1, further comprising at least one tab integrally formed on a backside of said at least one second injection molded part operably coupled to a rack movable along a chroming path while the electric current is applied through the at least one tab to apply chrome to be applied to the desired areas.

3. The final injection molded assembly of claim 1, wherein the first material does not accept the chrome material and has a high gloss finished surface, and the second material is polycarbonate acrylonitrile butadiene styrene that accepts the chrome material.

4. The final injection molded assembly of claim 1, wherein the pathway is integrally formed with a front side and a backside of the second injection molded part.

5. The final injection molded assembly of claim 4, wherein the pathway is not located on the perimeter of the final injection molded assembly.

6. The final injection molded assembly of claim 1, wherein the plurality of paths are integrally formed with the front side, which is a show surface side, of the second injection molded part.

7. The final injection molded assembly of claim 1, wherein the final injection molded assembly is selected from the group consisting of vehicle badges or emblems, exterior decorative trims, interior decorative trims, headlamp housings, fog lamp housings, and/or exterior grills.

* * * * *